June 22, 1926.
R. H. MUELLER ET AL
VALVE FITTING
Filed May 7, 1924
1,589,894
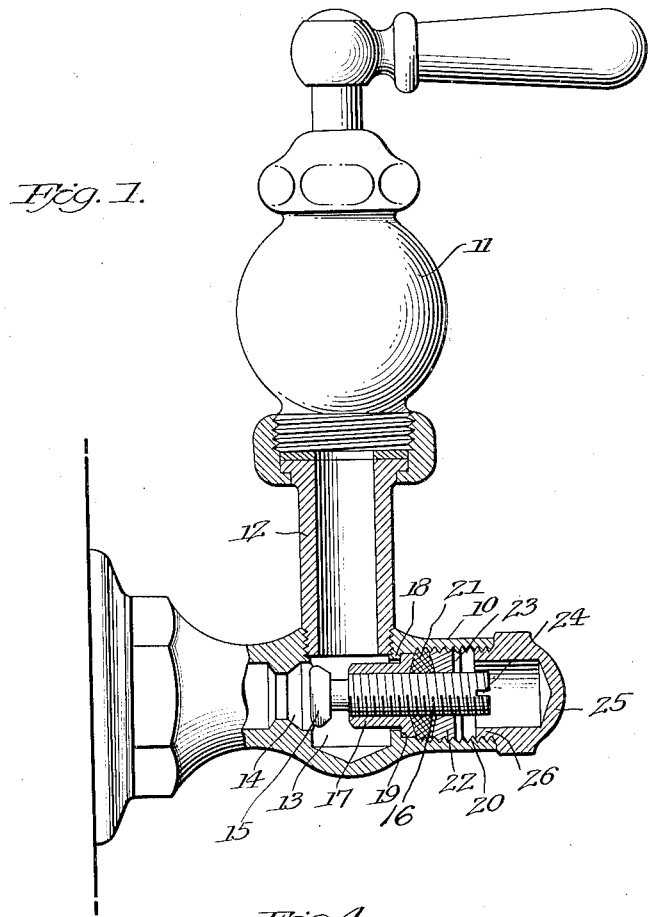
Inventor
Robert H. Mueller,
Chester W. Hathaway,
By Cushman Dryant Darby
Attorneys.

Patented June 22, 1926.

1,589,894

UNITED STATES PATENT OFFICE.

ROBERT H. MUELLER AND CHESTER W. HATHAWAY, OF DECATUR, ILLINOIS, ASSIGNORS TO ADOLPH MUELLER, TRUSTEE, OF DECATUR, ILLINOIS.

VALVE FITTING.

Application filed May 7, 1924. Serial No. 711,662.

This invention relates to improvements in fittings for cutting off or regulating the flow of liquid, and more particularly to a packing means for a movable member such as a valve stem which is adapted to provide a fluid tight joint between the inner wall of the fitting and the stem.

Heretofore in installations of this character the packing has been carried in a recess formed in the stem supporting member, so as to prevent leakage past the stem. In none of these devices are means provided for forming a tight sealing joint between the inner wall of the fitting and the valve supporting member.

A primary object of the present invention consists in positioning a packing between two independent members mounted on the valve stem, so that when the parts are set up, the packing will be forced into fluid tight engagement with the wall of the fitting as well as with the valve stem.

The construction of the fitting is such that the parts are easily removable and access may be readily had to the interior of the fitting for the purpose of renewal or repair. Additionally the fitting comprises a relatively small number of parts which may be inexpensively produced and quickly set up.

Referring to the drawings:

Figure 1 is a side elevational view of the basin cock and fitting with parts shown in section, for the purpose of clearness of illustration.

Figure 2 is a partial sectional view of a modified form of the invention.

Figure 3 is a section taken substantially along the line 3—3 of Figure 2.

Figure 4 is a detail view of the supporting plug shown in Figure 2.

Referring to the drawings in which like numerals indicate like parts in the several views, 10 denotes a supply fitting, which is connected to a faucet 11 by the coupling pipe 12 in the manner as shown in Figure 1. While we have for the purpose of illustration, disclosed our improved stop applied to an angle coupling, obviously the fitting may be applied to any other form of valve without departing from the scope of the invention.

The fitting 10 is provided with a longitudinal orifice 13 and a valve seat 14. The valve 15 which engages the valve seat has a threaded stem 16 which extends through a central threaded opening in the supporting plug 17. The inward movement of the plug 17 is limited by the annular flange 18 formed on the inner wall of the fitting 10, which abuts the shoulder 19 on the plug.

The fitting 10 is interiorly threaded at its outer end as at 20 and receives the packing 21 carried by the stem 16. The packing 21 which is composed of any suitable material, is of such a diameter as to engage the inner wall of the fitting 10 and form a fluid tight joint therewith, when the parts are set up. A packing nut 22 threaded to the stem 16 and the inner wall of the fitting, maintains the packing in tight sealing engagement with the stem and the inner wall of the fitting. The inner ends of the plug 17 and the nut 22 are preferably dished or tapered so that the packing member 21, positioned between them, will be forced radially against the stem and the inner wall of the fitting when the nut is tightened. The supporting plug 17 is prevented from rotating relative to the fitting by reason of the tight frictional engagement of the flange 18 with the shoulder 19 on the plug.

Radial notches 23 formed in the outer face of the nut 22, are arranged to receive a spanner wrench or other suitable tool, for permitting turning movement to be imparted to the nut 22. The outer end of the stem 16 is provided with a slot 24 adapted to receive a tool for actuating the stem to move the valve head 15 to and from the seat 14, as may be desired.

A closure cap 25 having an exteriorly threaded portion 26, adapted to be screwed into the interior wall of the fitting 10, as shown in Figure 1, is preferably made of the same material as the fitting, and in addition to preventing tampering with the stop valve, gives a neat and pleasing appearance to the fitting.

It will be seen that by reason of the present construction, the fluid tight packing 21 formed between the valve stem and the fitting, will be maintained at all times in proper sealing engagement, by means independent of the stem, namely the plug 17 and the nut 22, positioned on opposite sides of the packing. Furthermore, quick access may be had to the interior of the fitting for regulating the valve 15, or inspecting the parts, for the purpose of repair or renewal, by removing the cap 25 and the nut 22.

In the form of the invention illustrated in Figure 2, the construction is substantially similar to that above described, with the exception that the fitting 27 is provided with an orifice 26 in which projects an annular flange 28, having longitudinal corrugations or serrations 29 which interlock with the corrugations 30, on the supporting plug 31, as shown in Figure 3, so as to prevent the plug from turning relative to the fitting. Inward movement of the plug within the fitting is limited by the annular flange 31' on the plug, which abuts the flange 28.

The valve seat 32 within the fitting receives the valve 33, having a threaded stem 34, which extends through the supporting plug 31. The stem 34 is provided at its outer end with a slot 38 arranged to receive a suitable tool for moving the valve head to and from its seat.

A packing 39 positioned between the plug 31 and the packing nut 40 engages the inner wall of the fitting 27, so as to form a fluid tight connection between the valve stem 34 and the fitting. The nut 40 may be turned by means of any suitable tool which fits into the radial notches 41, formed in the outer face of the nut.

The closure cap 42, having an externally threaded reduced portion 43, engages the complementary threads formed in the inner wall of the fitting, so as to permit ready access to the valve stem and its associated parts, for the purpose of repair or renewal.

It is to be understood that the forms of the invention herewith shown and described are merely illustrative and in no sense restrictive, and that such changes as fall within the purview of one skilled in the art may be made without departing from the spirit of the invention and the scope of the appended claims.

We claim:

1. A fitting of the class described having an orifice therethrough and interiorly threaded at its outer end, a flange on the inner wall of said fitting, a plug having a shoulder at one end thereof, abutting said flange, said plug having a threaded opening therein, a threaded valve stem extending through said opening, a packing engaging the end of said plug, the stem and the wall of said fitting, a nut threaded within said fitting and contacting with said packing, and a closure cap threaded to the interior wall of said fitting.

2. A fitting of the class described having an orifice therethrough, an internal flange on the fitting provided with corrugations, a valve within the fitting having a threaded stem, a plug surrounding and threaded to the valve stem and projecting into said orifice, said plug having a flange to engage the internal flange on the fitting and provided with a corrugated portion adapted to interlock with the complementary corrugations on the internal flange, a packing engaging one end of the plug, a nut disposed within the said fitting and engaging the valve stem, the inner wall of the fitting and the packing, and a cap closing said fitting adjacent the end of the stem.

3. A fitting of the class described having an orifice therethrough, a valve within the fitting having a threaded stem, a plug surrounding and threaded to the stem and having an enlarged portion provided with corrugations, means in said fitting provided with corrugations for interlocking with the corrugations on the plug and for limiting inward movement of the plug, a packing at one end of the plug, a nut threaded to the valve stem disposed within the said fitting and threaded to the inner wall of the fitting to engage said packing, and means for closing said fitting adjacent the end of the valve stem.

4. A fitting of the class described having an orifice therethrough, a valve within the fitting having a stem, a plug surrounding and threaded to the stem and having an enlarged portion provided on its periphery with corrugations, an annular flange in said fitting provided with corrugations for interlocking with the corrugations on the plug and for limiting the inward movement of said plug, a packing at one end of the plug, a nut on the valve stem disposed within the fitting and threaded to the inner wall of the fitting to engage said packing, and a closure for said fitting adjacent the end of the valve stem.

5. A fitting of the class described having an opening therethrough, a corrugated flange on the inner wall of said fitting, a valve seat formed in the fitting, a valve stem, a valve on said stem, a plug within said fitting provided with a corrugated surface adapted to engage the corrugations on said fitting flange to prevent rotation of said plug, the plug having an annular abutment adapted to engage the flange and prevent longitudinal movement thereof, a nut within the fitting on the valve stem, and a packing between said plug and said nut.

6. A plug of the class described having a body provided with stepped portions, one of said portions having a corrugated surface to prevent rotation of said plug, and the other of said portions adapted to act as an abutment for and prevent longitudinal movement of the plug.

In testimony whereof we have hereunto set our hands.

ROBERT H. MUELLER.
CHESTER W. HATHAWAY.